Patented Oct. 17, 1950

2,526,533

UNITED STATES PATENT OFFICE 2,526,533

PREPARATION OF NOVEL ESTERS OF BETA-HYDROXY CARBOXYLIC ACIDS BY THE REACTION OF BETA-LACTONES WITH PHENOLS

Warren L. Beears, Cleveland, Ohio, assignor to The B. F. Goodrich Company, New York, N. Y., a corporation of New York No Drawing. Application April 8, 1948, Serial No. 19,896

14 Claims. (Cl. 260—479)

This invention relates to the preparation of novel esters of beta-hydroxy carboxylic acids, particularly aryl hydracrylates, and pertains more specifically to the preparation of such compounds by the reaction of a phenol and a beta-lactone.

It is disclosed in U. S. Patent 2,356,459 to Frederick E. Küng that beta-lactones, that is lactones or inner esters of beta-hydroxy carboxylic acids may be obtained in good yields by the reaction of a ketene with an aldehyde or ketone. In this manner beta-propiolactone (also called hydracrylic acid lactone) which has the structure

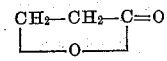

is economically obtained from ketene and formaldehyde.

It is further disclosed in a copending application, Serial No. 620,659, filed October 5, 1945, now Patent Number 2,449,991, that a beta-aroxy carboxylic acid is obtained when a beta-lactone is reacted with a phenol in the absence of added materials, or in the presence of an inert organic diluent, or in the presence of an aqueous solution of a base so as to form a salt of the phenol.

I have now discovered that when a beta-lactone is reacted with a phenol in the presence of a catalytic amount of a strong mineral or inorganic acid, reaction occurs at the beta-carbon atom of the beta-lactone to form an aryl ester of a beta-hydroxy carboxylic acid; and that this reaction provides a convenient and economical method for preparing numerous useful organic compounds which have not heretofore been prepared.

The novel compounds of this invention possess the general formula

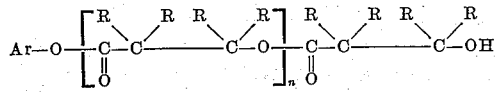

wherein Ar is an aryl hydrocarbon radical having its connecting valence on a nuclear carbon atom, each R is hydrogen or an alkyl, aryl or cycloalkyl radical containing from 1 to 6 carbon atoms, and n is 0 or 1. The reaction to form the compounds of the above formula where n is 0, proceeds, in general, as represented by the following equation:

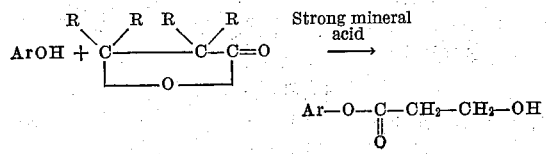

wherein Ar and R have the meaning set forth hereinabove.

The compounds of the above general formula wherein n is 1, are prepared by a secondary reaction involving the self-alcoholysis of the ester first formed by the reaction of the phenol with the beta-lactone. This secondary reaction, which occurs simultaneously with the primary reaction, may be represented as follows:

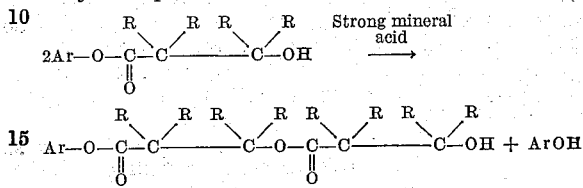

wherein Ar and R are the same as above.

In carrying out the reaction, a preferred procedure involves first adding the strong mineral acid catalyst, such as sulfuric acid, hydrochloric acid, phosphoric acid and the like, (preferably in catalytic amounts of approximately 1% by weight based on the weight of the beta-lactone, although amounts as small as .2% or smaller and as high as 4% or even higher may be used advantageously), to the phenol, and then adding the beta-lactone to the phenol-acid mixture with agitation. However, other procedures such as addition of the acid catalyst to a mixture of the phenol and the lactone may also be used. The reaction may also be conducted in an inert solvent or diluent such as hexane, benzene, carbon tetrachloride or the like or even water, although the use of such solvent or diluent is not necessary for the reaction to occur.

In order to recover the reaction products from the reaction mixture, the mineral acid catalyst is neutralized by the addition of a basic material such as an alkali metal alkoxide, inorganic base or other basic substance after which the excess of the phenol, if any, is removed preferably by distillation at reduced pressures. At this point small quantities of solid material, believed to be beta-lactone polymer and resulting from side reactions, may be present and can be easily removed by filtering. The residue is then preferably extracted with an organic solvent such as ether, benzene, and the like and the extract distilled, although, if desired, the residue itself may be distilled at reduced pressures to obtain the products. Compounds resulting from the primary and secondary reactions described above are conveniently separated from one another during the distillation.

By controlling the reaction time the proportionate amounts of the products obtained from the primary and secondary reactions can be conveniently controlled. For example when reacting beta-propiolactone with a phenol, highest amounts of aryl hydracrylate are obtained when the time of reaction is relatively short since the secondary reaction of self-alcoholysis is substantially slower than that of the primary reaction to form the aryl hydracrylate. When the reaction time is increased substantially higher yields of the secondary reaction product, that is, a beta-(carbaroxy) alkyl hydracrylate, are obtained. Thus, by selecting the proper reaction time, the desired amount of either reaction product can be obtained.

The quantities of the phenol and the beta-lactone used in the reaction are not critical and may be varied widely. The reactants may be brought together in equimolecular proportions (the quantities theoretically required for the reaction), although it is desirable that an excess of the phenol be utilized. Thus a phenol-beta-lactone ratio of from 3:1 to 6:1 is preferred although the ratio may be as low as 1:1 or as high as 8:1 or even higher.

Other conditions for the reaction such as temperature and pressure are also not critical. Highest yields of the desired products are generally obtained when temperatures of from 30° C. to 70° C. and atmospheric pressure are utilized. However, temperatures as low as 0° C. or lower or as high as 100° C. or even higher are also operative.

Any desired phenol of the formula ArOH wherein Ar is an aryl hydrocarbon radical may be used to react with the beta-lactones. Included in this class of phenols are phenol itself, cresols, xylenols, o, m and p-hydroxy styrenes, cumenol, naphthols, mono-hydroxy diphenyls, mono-hydroxy naphthalenes, mono-hydroxy anthracenes, mono-hydroxy di- and triphenyl methanes and the like.

Beta-propiolactone, the simplest possible beta-lactone, is the preferred beta-lactone for use in this invention because of the ease with which it reacts with phenols to produce aryl hydracrylates and because of its low cost. However, other beta-lactones of the general formula,

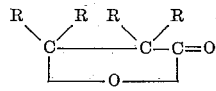

wherein each R is a member of the class consisting of hydrogen and alkyl, aryl and cycloalkyl radicals containing fewer than 7 carbon atoms may be used. Included among the beta-lactones of this general class are saturated aliphatic beta-lactones such as beta-butyrolactone, which gives aryl esters of beta-hydroxy butyric acid; beta-isobutyrolactone, which gives aryl esters of beta-hydroxy isobutyric acid; beta-valerolactone, which gives aryl esters of beta-hydroxy valeric acid; beta-isovalerolactone, which gives aryl esters of beta-hydroxy isovaleric acid; beta-n-caprolactone, which gives aryl esters of beta-hydroxy caproic acid; alpha-ethyl-beta-propiolactone, which gives aryl esters of alpha-ethyl beta-hydroxy propionic acid; alpha-isopropyl-beta-propiolactone, which gives aryl esters of alpha-isopropyl beta-hydroxy propionic acid; alpha-butyl-beta-propiolactone, which gives aryl esters of alpha-butyl-beta-hydroxy propionic acid; alpha-methyl-beta-butyrolactone, which gives aryl esters of alpha-methyl-beta-hydroxy butyric acid; alpha-ethyl-beta-butyrolactone, which gives aryl esters of alpha-ethyl-beta-hydroxy butyric acid, and the like.

Beta-lactones containing cycloalkyl and aryl substituents such as beta-cyclohexyl-beta-propiolactone, beta-phenyl-beta-propiolactone, alpha-phenyl-beta-propiolactone and the like may also be used to produce aryl esters of the corresponding beta-hydroxy carboxylic acids.

In order further to illustrate the invention the following specific examples are set forth but it is to be understood that the invention is not limited thereto. All parts are by weight.

*Example I*

288 parts (4 moles) of beta-propiolactone are added to 2,256 parts (24 moles) of phenol and 4 parts of concentrated sulfuric acid contained in a flask supported in a constant temperature bath and the reaction mixture is heated at 46° C. for a period of 6 hours. 6.2 parts (40%) excess of sodium methoxide are added to neutralize the acid catalyst and the excess phenol is removed under a reduced pressure of 20 mm. The residue is then poured into ether and 24 parts (8.3%) of solid material are filtered off. The ether solution is then extracted with a saturated sodium bicarbonate solution. The ether solution is dried over anhydrous sodium sulfate and the ether removed at reduced pressure. The residue remaining is distilled in a short path still whereupon 213 parts of substantially pure phenyl hydracrylate, B. P. 42-45° C./.0005 mm. are obtained.

| Analysis | Theory | Found |
|---|---|---|
| Saponification Equivalent | 166 | 166.5 |
| Molecular Refraction | 43.44 | 43.52 |
| Carbon _____ per cent | 65.09 | 65.06 |
| Hydrogen _____ do | 5.94 | 6.04 |

A second fraction, 226 parts, B. P. 92° to 96° C./0.6 mm. is identified as beta-(carbophenoxy) ethyl hydracrylate.

*Example II*

Example I is repeated except that the reaction time is reduced to one hour. 332 parts (50) of phenyl hydracrylate and 156 parts (32.8%) of beta-(carbophenoxy) ethyl hydracrylate, B. P. 92° to 96° C./0.6 mm. are obtained.

*Example III*

282 parts (3 moles) of phenol and 0.5 part of concentrated sulfuric acid are placed in a flask and 72 parts (1 mole) of beta-propiolactone are added with constant stirring. The temperature of the reaction mixture is maintained at 50° C. during the addition of the beta-propiolactone and for ten minutes thereafter. 0.8 part of sodium methoxide are then added to neutralize the catalyst and the excess phenol is removed by distillation at 20 mm. The residue is poured into ether and 8.5 parts of solid material are filtered off. The ether solution is washed with sodium bicarbonate solution and the ether layer dried over anhydrous sodium sulfate. The sodium sulfate is removed by filtering and the ether removed at reduced pressure. The residue is distilled and 66 parts (39.8) of phenyl hydracrylate (B. P. 42° to 45° C./.0005 mm.) and a 37% yield of beta-(carbophenoxy) ethyl hydracrylate are obtained.

*Example IV*

324 parts (3 moles) of ortho-cresol and 0.5 part of concentrated sulfuric acid are placed in a reaction flask fitted with stirrer, condenser and dropping funnel and heated to a temperature of 50° C. 72 parts (1 mole) of beta-propiolactone are added to the reaction flask over a period of 15 minutes. 0.61 part of sodium methoxide are then added to neutralize the catalyst and the excess ortho-cresol is removed at 84% C. and a pressure of 16 mm. The residue is poured into ether, whereupon a very small amount of resinous, gummy precipitate (apparently beta-propiolactone polymer) is formed. The precipitate is removed by filtering. The ether filtrate is washed with a saturated sodium bicarbonate solution and with water. The ether layer is dried over anhydrous sodium sulfate and the ether removed by distillation at reduced pressure and 68 parts of otho-cresyl hydracrylate (B. P. 83° to 84° C./0.1 mm.) are obtained. A second fraction consists of beta-(carbo-o-cresoxy) ethyl hydracrylate.

*Example V*

Example IV is repeated except that m-cresol is substituted for o-cresol. A 41.3% yield of m-cresyl hydracrylate (B. P. 84° to 85° C./0.1 mm.) is obtained. Beta-(carbo-m-cresoxy) ethyl hydracrylate is also obtained.

*Example VI*

Example IV is repeated substituting p-cresol for o-cresol. 46.5% of p-cresyl hydracrylate (B. P. 83° to 85° C./0.1 mm.) is obtained. A second fraction consists of beta-(carbo-p-cresoxy) ethyl hydracrylate.

*Example VII*

Example I is repeated substituting beta-butyrolactone for beta propiolactone. On distillation of the product a colorless oil, the phenyl ester of beta-hydroxy butyric acid is secured as a first fraction and another colorless oily material resulting from self-alcoholysis of this material is secured as a second fraction. The yields are good but not so high as in Example I.

As has been indicated hereinabove, the aryl hydracrylates, the beta-(carbaroxy) alkyl hydracrylates and the other aromatic esters of beta-hydroxy carboxylic acids, are all very valuable chemical compounds. For example, they are useful as solvents and plasticizers for resinous and rubbery materials such as cellulose derivatives, vinyl resins, synthetic rubber and the like. The aryl hydracrylates are especially useful in that they may be heated in the presence of a dehydrating agent, whereupon a molecule of water is removed to form the corresponding acrylates which are useful polymerizable materials. In addition, the new compounds of ths invention may be used as chemical intermediates and for many other purposes.

Numerous modifications and various of the invention will be obvious to those skilled in the art and are included within the spirit and scope of the appended claims.

I claim:

1. The method which comprises reacting a phenol of the formula ArOH wherein Ar is an aryl hydrocarbon radical, with a beta-lactone of the formula

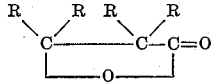

wherein each R is a member of the class consisting of hydrogen and lower alkyl radicals such that the lactone contains from 3 to 6 carbon atoms, in the presence of a strong mineral acid catalyst and recovering a compound of the formula

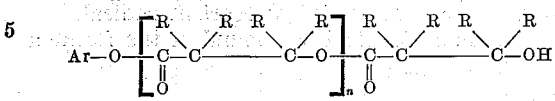

wherein $n$ is a numeral, including zero, less than two and Ar and each R have the same meaning as above.

2. The method which comprises reacting a phenol of the formula ArOH wherein Ar is an aryl hydrocarbon radical, with beta-propiolactone in the presence of a strong mineral acid catalyst and recovering a compound of the formula

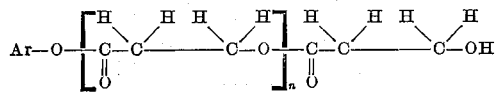

wherein $n$ is a numeral, including zero, less than two and Ar has the same meaning as above.

3. The method which comprises reacting a phenol of the formula ArOH, wherein Ar is an aryl hydrocarbon radical with beta-propiolactone in the presence of a strong mineral acid catalyst and recovering a compound of the formula

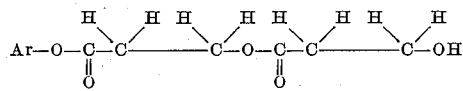

wherein Ar has the same meaning as above.

4. The method which comprises reacting a phenol of the formula ArOH, wherein Ar is an aryl hydrocarbon radical, with beta-propiolactone in the presence of a strong mineral acid catalyst, and recovering a compound of the formula

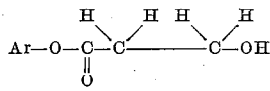

wherein Ar has the same meaning as above.

5. The method which comprises reacting phenol and beta-propiolactone in the presence of a strong mineral acid catalyst and recovering phenyl hydracrylate.

6. The method which comprises reacting phenol and beta-propiolactone in the presence of a strong mineral acid catalyst and recovering beta-(carbophenoxy) ethyl hydracrylate.

7. The method which comprises reacting ortho-cresol with beta-propiolactone in the presence of a strong mineral acid catalyst and recovering ortho-cresyl hydracrylate.

8. The method which comprises reacting phenol with beta-propiolactone at a temperature of from 40° C. to 60° C. and in the presence of a sulfuric acid catalyst, and distilling the reaction product to recover phenyl hydracrylate and beta-(carbophenoxy) ethyl hydracrylate.

9. A new chemical compound of the formula

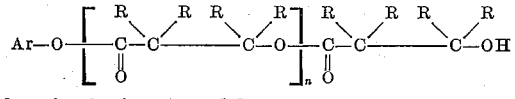

wherein Ar is an aryl hydrocarbon radical, each R is a member of the class consisting of hydrogen and lower alkyl radicals such that each

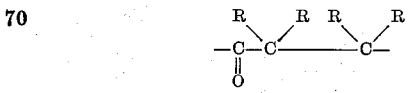

structure contains from 3 to 6 carbon atoms, and $n$ is a numeral, including zero, less than two.

10. A new chemical compound of the formula

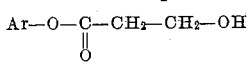

wherein Ar is an aryl hydrocarbon radical.

11. A new chemical compound of the formula

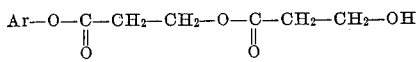

wherein Ar is an aryl hydrocarbon radical.

12. As a new chemical compound phenyl hydracrylate of the formula

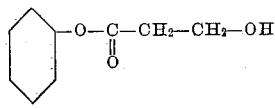

13. As a new chemical compound beta-(carbophenoxy) ethyl hydracrylate of the formula

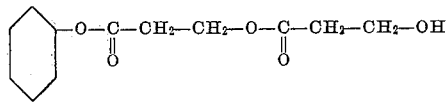

14. As a new chemical compound ortho-cresyl hydracrylate of the formula

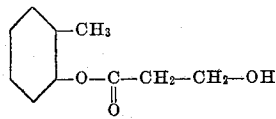

WARREN L. BEEARS.

No references cited.